No. 649,280. Patented May 8, 1900.
H. W. DOVER.
DRIVING CHAIN COVER.
(Application filed June 27, 1899.)
(No Model.) 2 Sheets—Sheet 2.
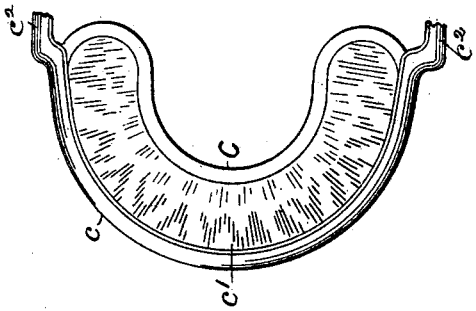
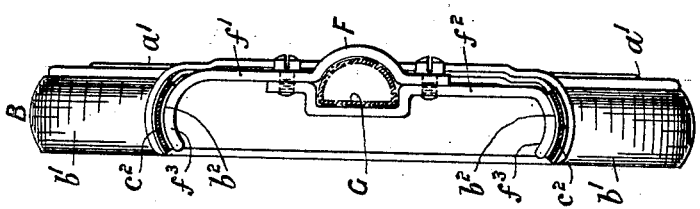
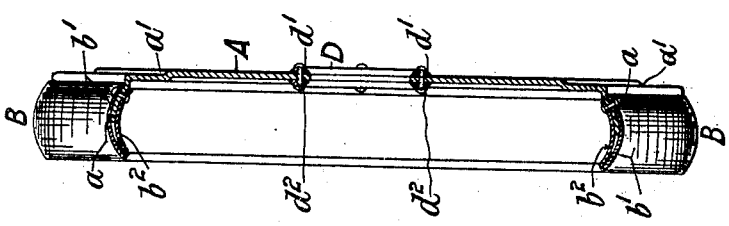
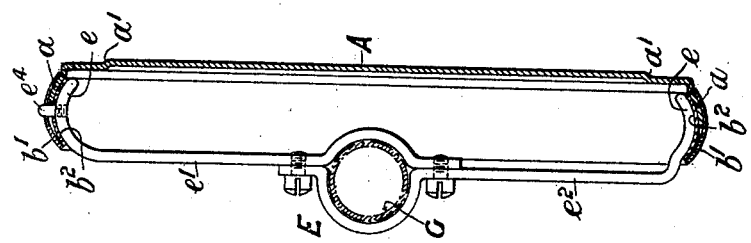
Witnesses:
Inventor
Horace W. Dover
By Munn
Attorneys

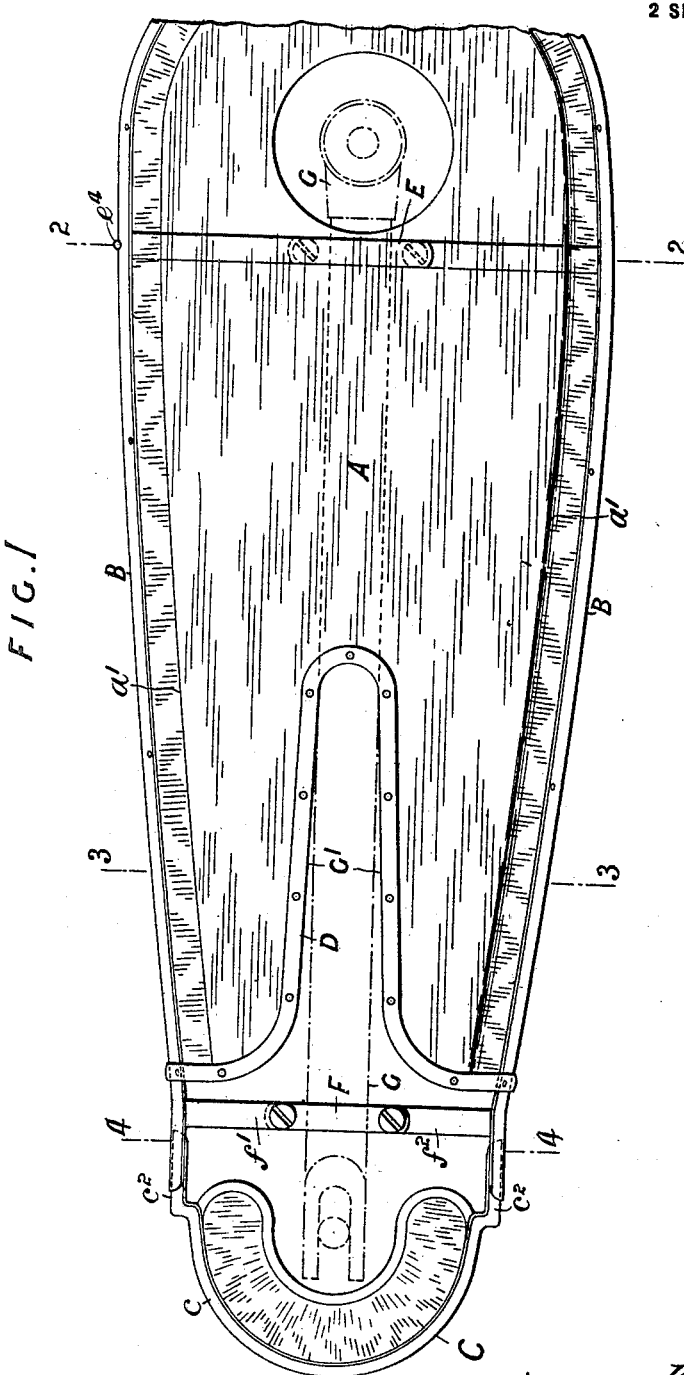

UNITED STATES PATENT OFFICE.

HORACE WALTER DOVER, OF NORTHAMPTON, ENGLAND.

DRIVING-CHAIN COVER.

SPECIFICATION forming part of Letters Patent No. 649,280, dated May 8, 1900.

Application filed June 27, 1899. Serial No. 722,097. (No model.)

*To all whom it may concern:*

Be it known that I, HORACE WALTER DOVER, engineer, managing director of Dover, Limited, of Park road, St. James End, Northampton, England, have invented new and useful Improvements in Driving-Chain Covers for Cycles and Motor-Vehicles, (for which applications for patent have been filed in Great Britain, dated May 12, 1899, No. 10,087, and in France, dated May 25, 1899, No. 277,166,) of which the following is a full, clear, and exact description.

This invention relates to improvements in chain-covers for single and tandem bicycles and tricycles, motor-bicycles, motor-tricycles, and automobiles in which chains are used; and the invention has for its object to provide a light and elegant chain-cover for preventing the skirt or trousers of the rider from becoming entangled with or soiled by the driving-gear and which is capable of being dismounted for cleaning or any other purpose and replaced with the utmost facility.

The invention is illustrated in the accompanying drawings, forming part of this specification, wherein—

Figure 1 is a face view of a chain-cover. Figs. 2, 3, and 4 are cross-sections of the same on lines 2 2, 3 3, and 4 4, respectively. Fig. 5 shows the detachable rear end of the cover separately.

The same letters of reference denote like parts in all the figures.

The chain-cover is constructed of a panel A, of celluloid, patent-leather, or similar material, fixed in a rim or frame B. The panel A is formed with a flange $a$, which is clamped between the inner and outer members of the frame or rim B, the said rim or frame being constructed of two superposed strips $b'$ $b^2$ of steel or other metal rolled or otherwise brought to a concavo-convex cross-section and bent to the configuration of the chain-cover, while the flange $a$ of the panel is molded to a corresponding curvature and clamped between the two strips $b'$ $b^2$ by rivets passing through the strips and the intervening flange of the panel, whereby the latter is very firmly secured.

In the operation of molding the flange of the panel so as to bring it to the transversely-curved form, upturned in a direction substantially perpendicular to the plane of the panel, as shown, the pressure of the mold may in the case of a panel of celluloid or similar material extend slightly inward from the flange itself, so as to form a beveled marginal impression $a'$ around the panel corresponding in configuration to that of the frame B. The body portion of the chain-cover thus constructed extends nearly to the back-fork end, and it is completed by a detachable end portion C, which encircles the hub sprocket-wheel.

G represents in dotted lines one of the compression-stays of the machine-frame.

The panel A is strengthened and ornamented by a rib D, formed of two half-round wires $d'$ $d^2$, bent to a configuration such as shown and riveted together with the panel between them, the rib thus formed following the configuration of the longitudinally-extending opening or slot G', which would require to be cut in the panel A, in order to give passage to the compression-stay when, as is frequently the case, the compression-stay runs in an outwardly-splayed or oblique direction. In cutting out this slot the rib D serves as a guide for the knife, and when the slot has been thus cut the rib D then serves as a rim or border to stiffen the panel and protect the edges of the slot, and it also strengthens the rear end of the frame B, to which its ends are also riveted.

The chain-cover is supported on the machine-frame by a bracket E, formed of two members $e'$ $e^2$, clamped to the stay G in rear of the bottom bracket, the return end portions $e$ of the upwardly and downwardly extending arms of said bracket being bent to a curvature corresponding to the transverse curvature of the frame B, which frame is capable of being easily sprung into position of engagement with the ends $e$ of the bracket. The one end of the bracket has a stud $e^4$, which enters a hole in the frame B, so as to determine and insure the position of the chain-cover in the longitudinal direction. The chain-cover is supported at its rear open end upon a similar bracket F, formed of two members $f'$ $f^2$, clamped to the stay G, the ends $f^3$ of the bracket being curved to fit in the hollow of the frame B of the chain-cover, as before.

The security of the connection of the frame B with the bracket F is insured (without a stud and hole) by the detachable end portion C of the cover. The said end portion C has a rim formed of a steel strip $c$ of concavo-convex cross-section and U shape, to which is riveted a semi-annular front plate $c'$, adapted to stiffen the rim and partially inclose the front of the hub sprocket-wheel, this end portion C of the chain-cover being detachably connected to the chain-cover proper by the forwardly-projecting ends $c^2$ of its rim entering into sliding engagement with the rim-frame B of the chain-cover, each of said ends $c^2$ fitting, as shown in Figs. 1 and 4, tightly between the ends of the two members $b'$ $b^2$ of which the frame B is formed. For this purpose the ends of these members $b'$ $b^2$ project somewhat in rear of the point where the flange of the panel A terminates and are set parallel to the center line of the cover, the ends $c^2$ of the detachable end cap C being also set parallel to each other, so as to enable the length of these ends to be varied by cutting them without interfering with the telescopic fit. This detachable end portion C being entirely of metal, and therefore comparatively rigid, serves by its engagement with the frame B of the chain-cover to reinforce the same and hold it in secure engagement with the rear bracket F, so that although when the end portion C is detached the chain-cover may be easily sprung on and off the brackets E and F. The detachable end portion C when applied serves to lock the chain-cover in position.

The invention may be applied to tandems and other cycles as well as to ordinary bicycles.

I claim—

The combination with a driving-chain cover having a sheet-metal rim-frame, formed of superposed metal strips of transversely-curved section riveted together and clamping between them the intervening flange of a panel inclosing one side of the frame, of a detachable end cap having a rigid U-shaped rim-frame of transversely-curved section and whose ends are adapted to slide and fit between the members or strips composing the frame of the chain-cover, and thereby lock the frame of the chain-cover on its supporting-bracket substantially as specified.

Signed by the said HORACE WALTER DOVER this 13th day of June, 1899.

HORACE WALTER DOVER.

In presence of—
ROBERT FRISBY,
PHILLIP HENRY DANCE.